United States Patent [19]

Hudimac, Jr.

[11] 4,290,700

[45] Sep. 22, 1981

[54] MEASURING APPARATUS FOR SHOT DISPENSERS

[75] Inventor: George S. Hudimac, Jr., Allentown, Pa.

[73] Assignee: Mechanical Service Company, Allentown, Pa.

[21] Appl. No.: 92,332

[22] Filed: Nov. 8, 1979

[51] Int. Cl.³ .............................................. B28C 7/04
[52] U.S. Cl. ..................................... 366/76; 222/135;
222/217; 366/159; 366/160; 366/162; 366/178;
366/182
[58] Field of Search ................... 366/76, 96, 152, 159,
366/160–162, 177, 182, 341; 222/135, 140, 217,
216, 307, 308, 145

[56] References Cited

U.S. PATENT DOCUMENTS

| | | | |
|---|---|---|---|
| 2,498,100 | 2/1950 | Tyrrell | 222/217 |
| 2,550,903 | 5/1951 | Berch | 222/217 |
| 3,782,272 | 1/1974 | Cooper | 222/217 |
| 3,814,289 | 6/1974 | Robbins | 222/135 |
| 4,193,701 | 3/1980 | Koch et al. | 366/177 |

*Primary Examiner*—Philip R. Coe
*Assistant Examiner*—Timothy F. Simone
*Attorney, Agent, or Firm*—Frederick J. Olsson

[57] ABSTRACT

Measuring apparatus has a pair of cavities which are put into a charge position to respectively receive precise quantities of resin and hardener from supply sources. The quantities are then transferred to a discharge position wherein the resin and hardener are pushed out of the respective cavities to feed a mixer. The additional material entering the mixer causes the same to eject mixed resin and hardener equal to the unmixed resin and hardener received.

5 Claims, 9 Drawing Figures

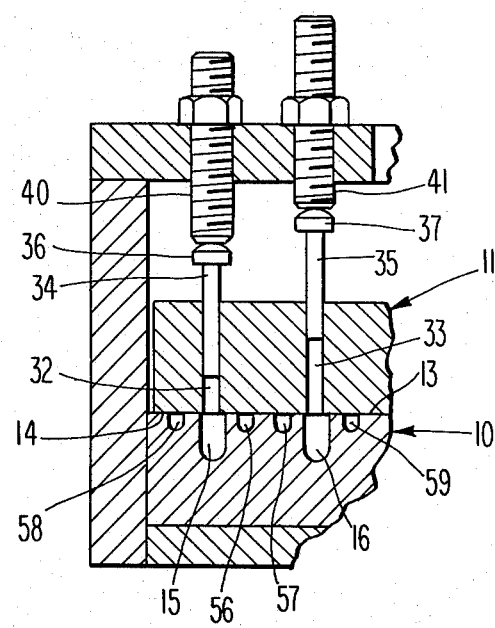
Fig. 4
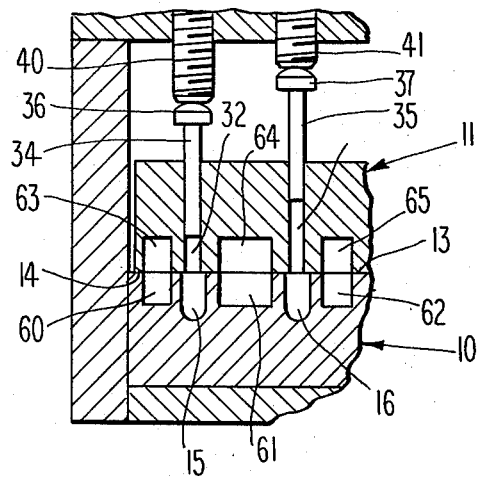
Fig. 5
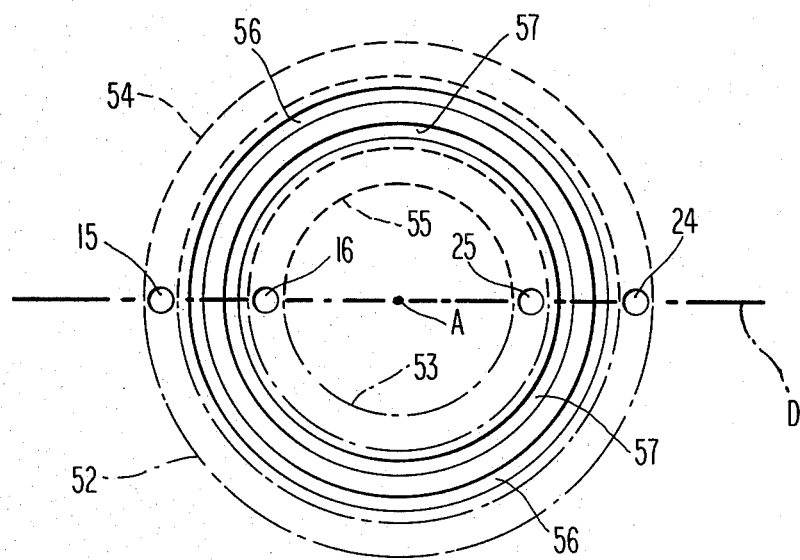
Fig. 6
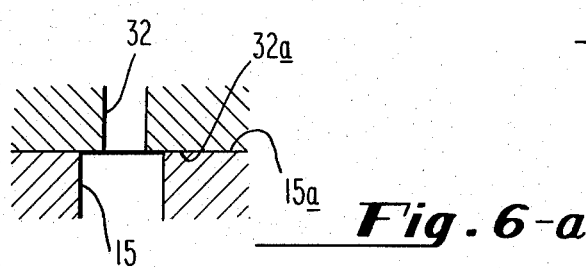
Fig. 6-a

MEASURING APPARATUS FOR SHOT DISPENSERS

This invention relates in general to adhesive applicators and particularly to applicators for dispensing small, precise quantities of a mixture of adhesive ingredients and especially ingredients which must be kept separate at all times prior to mixing.

Apparatus of the kind in question conventionally includes independent supply means for the ingredients, a measuring means to receive ingredients from the supply means and to deliver measured quantities to a mixer which mixes and discharges small quantities of same on to a part to be joined to another part.

In systems of the kind in question, it is important to maintain the weight and/or volume ratio of ingredients in the mix at a constant value irrespective of the viscosity of the ingredients. Otherwise the strength of the joint will not be within the design parameter. An undetected low-strength joint could be a disaster.

Conventional measuring systems known to me do not maintain such a constant ratio especially with change in viscosity of one or both of the ingredients.

The principal object of the invention is to provide apparatus which solves the above mentioned problem and has the additional advantage of high speed even with highly viscous material.

The improved measuring apparatus will be described below in connection with the following drawings wherein:

FIGS. 4 and 5 are fragmentary views of the apparatus as shown in FIG. 3 respectively with modifications;

FIG. 6 is a view to illustrate certain operative features of the apparatus of FIGS. 2 and 3;

FIG. 6a is a fragmentary view to illustrate working or sealing surfaces;

Figure 1:
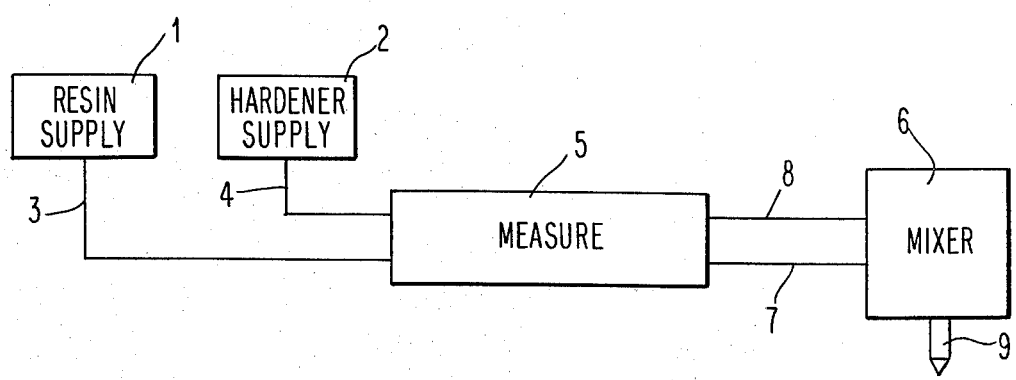
FIG. 1 is a block diagram illustrating the major components of a dispensing system of the kind in question, for example, a system that dispenses a mixture of resin and hardener.

As noted in FIG. 1, the major components of a system of the kind in question includes the resin supply 1 and the hardener supply 2 which respectively pressure feed these materials or ingredients thru lines 3 and 4 into a measuring device 5 which takes pre-selected quantities of resin and hardener and delivers same to a mixer 6 thru delivering lines 7 and 8. The entry of the resin and hardener in the mixer causes the same to discharge a mix thru nozzle 9, the volume of the discharge mix being substantially equal to the combined volume of the resin and hardener received.

Figure 2:
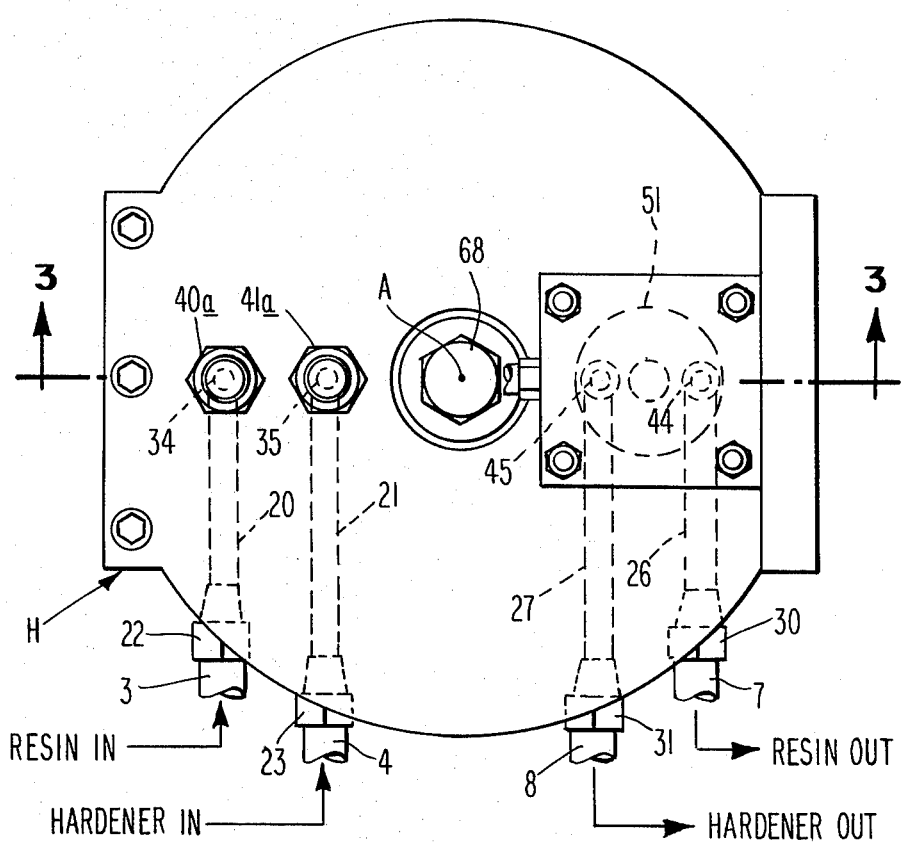
FIG. 2 is a plan view of the improved measuring apparatus for use in a system as illustrated in FIG. 1.
Figure 3:
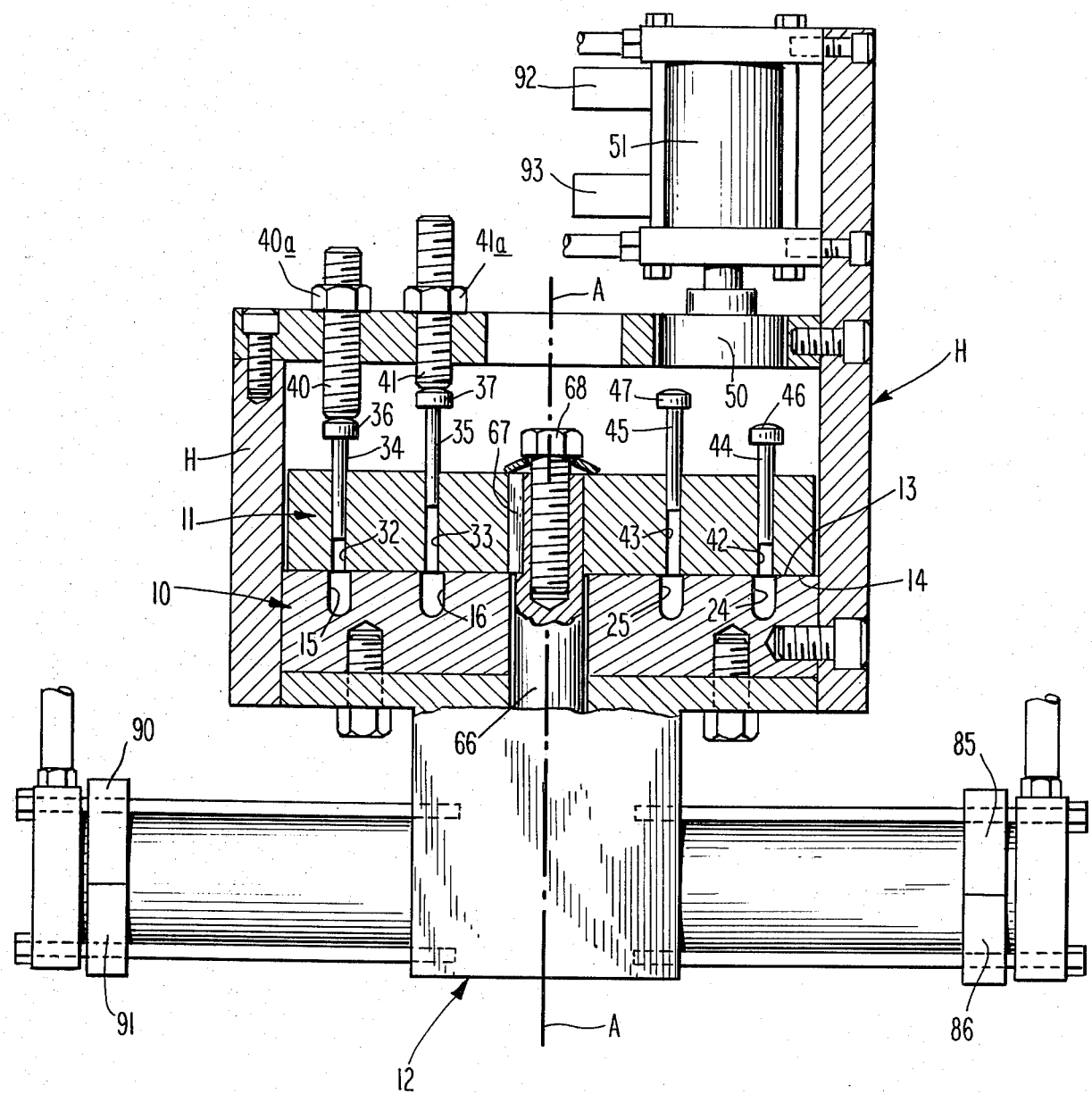
FIG. 3 is an elevational view partially in section taken along the lines 3—3 of FIG. 2.

The improved measuring apparatus will now be described:

In FIGS. 2 and 3 the letter H indicates a hollow housing which is adapted to be mounted in the dispensing system by means not shown.

On the bottom inside of the housing is fixedly secured a manifold block 10. The block 10 is generally disc-like in shape. Slidably mounted on top of the manifold block is another disc-like block or transporter 11. The transporter 11 is adapted to be oscillated about the axis A, back and forth over a 180° span by the rotary air cylinder 12. Resin and hardener from the supply are fed from the manifold block 10 into the transporter 11 which receives precise quantities of same. The transporter 11 is then moved so that the resin and hardener can be discharged into the mixer.

The manifold 10 has a flat, lapped upper surface 13 which engages a flat, lapped under surface 14 on the transporter 11.

Inlet ports 15 and 16 are formed in the manifold 10. These inlet ports extend inwardly of the manifold and the mouths of the inlet ports are open to the surface 13.

The inlet ports 15 and 16 are respectively connected to the inlet passages 20 and 21. The passages 20 and 21 suitably terminate at the exterior of the housing where fittings 22 and 23 connect the same to resin feed line 3 and hardener feed line 4. Outlet ports 24 and 25 are also formed in the manifold and extend inwardly and have their respective mouths open to the surface 13.

The outlet ports 24 and 25 are respectively connected to the outlet passages 26 and 27 which terminate at the exterior of the housing where fittings 30 and 31 connect the same to resin and hardener delivery lines 7 and 8.

As will be evident from an inspection of FIG. 6, the inlet ports 15 and 16 and the outlet ports 24 and 25 lie along a diameter D intersecting the axis A and are respectively equally radially spaced from the axis A. Ports 15 and 24 form one pair and ports 16 and 25 form another pair.

Transporter 11 has a pair of cavities 32 and 33 which are formed by bores extending thru the manifold. In the position shown, the cavities 32 and 33 are in registery with the inlet ports 15 and 16. This is the "charge" position of the cavities as determined by the transporter. It will be evident that resin and hardener can flow from lines 3 and 4, thru passages 20 and 21, thru ports 15 and 16 and up into the cavities 32 and 33.

The cavities carry pistons 34 and 35 having heads 36 and 37. Each piston makes a snug, sliding fit with its cavity. Resin and hardener extering the respective cavities under pressure will push the pistons upwardly.

The amount of resin and hardener which can enter or fill the cavities 32 and 33 is controlled by the axial positions of the pistons, the positions being determinable by the engagement of the heads 36 and 37 with the studs or abutments 40 and 41. This is the charge position of the pistons. Therefore, accuracy in the amount of resin and hardener is assured.

The abutments 40 and 41 are simply studs which are threaded in the top of the housing so as to be adjustable back and forth and held in the desired position as by nuts 40a and 41a.

After the cavities 32 and 33 are filled with the resin and hardener, the transporter is moved to a position wherein the resin and hardener are discharged from the cavities. Before describing this, it will be helpful to comment on additional structure in the transporter.

The transporter 11 has another pair of cavities 42 and 43 identical to cavities 32 and 33. The cavities 42 and 43 carry pistons 44 and 45 having heads 46 and 47. These pistons are identical to pistons 34 and 35. The purpose of the cavities 42 and 43 and the pistons 45 and 46 is to increase the operating rate by virtue of the condition that the resin and hardener charge into one set of cavities and substantially simultaneously resin and hardener can be discharged from the outer set. This will become apparent as the description proceeds.

To discharge the resin and hardener from the cavities 32 and 33 the transporter is rotated 180° to bring the cavities 32 and 33 in registry with the outlet ports 24 and 25. At that point, the pistons 34 and 35 will occupy exactly the same positions as shown for the pistons 44 and 45 since there is no pressure on the resin and hardener to force the pistons upwardly. The foregoing is the discharge position of the cavities.

Figure 7:
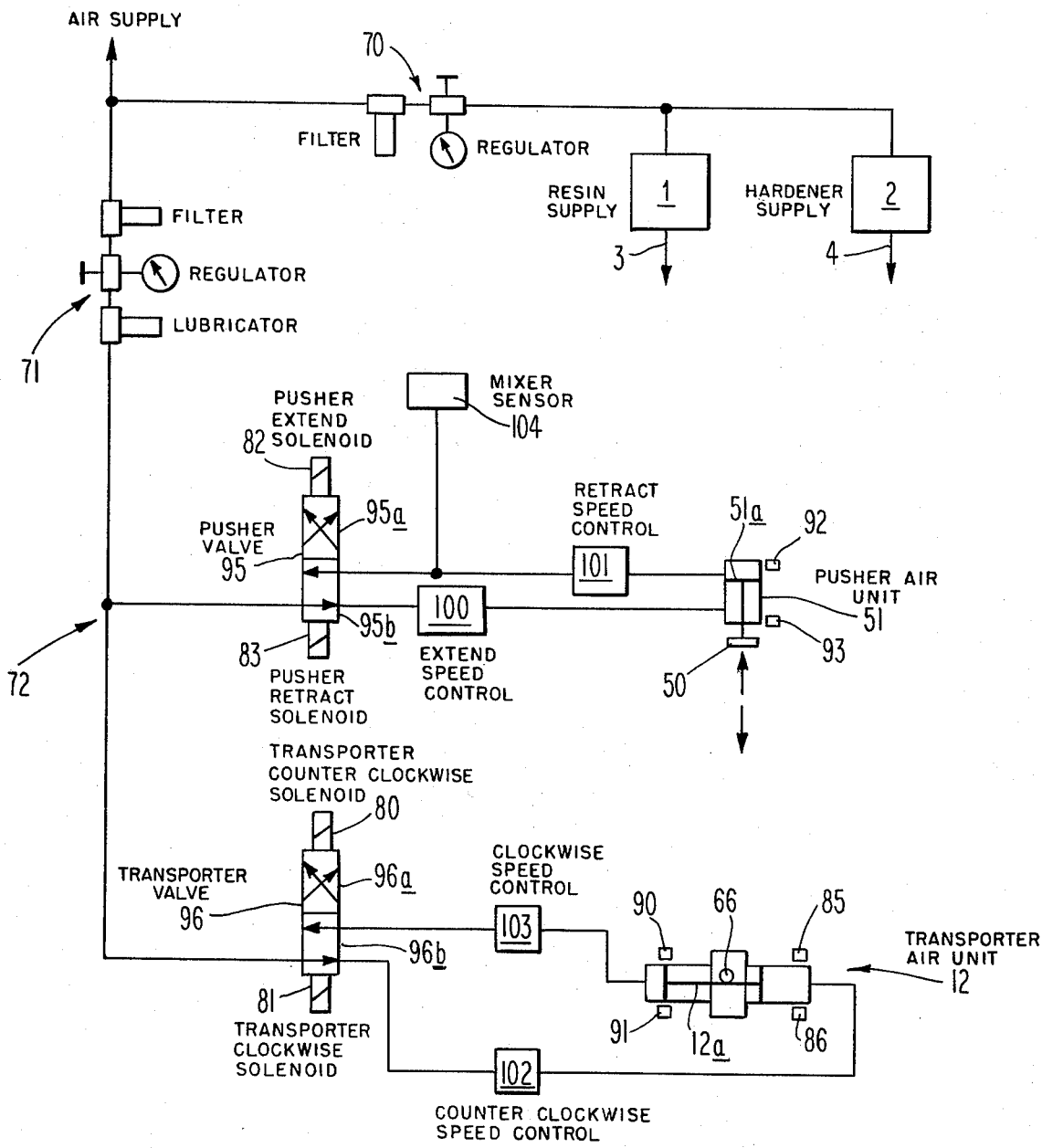
FIG. 7 is a schematic view of an air control system for the apparatus.

A pusher 50, controlled by air unit 51, engages the pistons to move the same down from the charge to the discharge position. The discharge position is determined by the heads 36 and 37 engaging the top of the transporter which thus serves as an abutment. In the discharge position, the lower end of the each piston is flush with the mouth of its cavity. The pusher 50 is connected to the piston 51a of the air unit (FIG. 7).

In FIG. 3, the pusher 50 is shown in its retracted position spaced from the pistons. The air unit 51 moves the pusher 50 down from the retracted position to engage the pistons and move the same down to the discharge positions or until heads engage the transporter. This causes the resin and hardener in the cavities to be pushed out. Assuming that the outlet ports 24 and 25 and the outlet passages 26 and 27 are respectively filled with resin and hardener, the additional material will move the material already in the outlet ports 24 and 25 and passages 26 and 27 and thus cause resin and hardener to enter the mixer. The mixer then will discharge the same amount as it receives in resin and hardener. After discharge, the air unit moves the pusher to the retract position leaving the pistons down in their discharge positions.

It is highly desirable to avoid the intermix of resin and hardener when the components are in the charge position, in the discharge condition and when moving between the same. The cavity, inlet and outlet port arrangement and the surfaces 13 and 14 combine to provide the necessary containment.

In the charge and discharge positions, the respective resin and hardener ports/cavities are radially spaced and are surrounded by surfaces which make a substantial static seal. Also the radial spacing provides that the cavities follow spaced orbits is moving from charge to discharge and during this motion the surfaces make a substantial wiping seal. The foregoing is explained following.

With reference to FIG. 3, it will be observed that areas of the transporter surface 14 immediately surrounding the cavities 32 and 33 (also 42 and 43) engage areas on the manifold surface 13. The engaging surface areas are termed working surfaces. The condition is better indicated in FIG. 6a where the working surface around cavity 32 is indicated at 32a and the working surface around the inlet 15 is indicated at 15a.

When the transporter 11, is moved from the charge to the discharge position, it is necessary to contain the resin and hardener in the cavities 32 and 33 and to contain the resin and hardener in the inlets 15 and 16 (since the same are under pressure). The foregoing is also accomplished by engaging working surfaces as explained following particularly in connection with FIG. 6.

As the transporter starts to move counter clockwise, the working surfaces around the cavities 32 and 33 begin to trace arcuate paths across the surface 13. The contact areas or arcuate working surfaces lie between the dot-dash lines 52 and 53 in FIG. 6. Thus the mechanical seal of the cavities 32 and 33 is maintained as the transporter moves.

The width of each piston head 36 and 37 is such that they remain in contact with abutments 40 and 41 until the working surfaces around the cavities 32 and 33 are actually wiping on the surface 13. With pressure removed, the pistons remain in the same position.

In addition, as the transporter starts to move the surface 14 on the underside of the transporter begins to cover the inlet ports 15 and 16. These contact areas or acurate working surfaces lie between the dotted lines 54 and 55. Thus, the resin and hardener in the inlet ports is confined.

The sealing effect of the working surfaces as described above is normally sufficient to contain the flow of resin and hardener as between the inlet and outlet and as between the areas between the 52–55.

In some instances for example depending on viscosity it is desirerable that the containment further include trap means. In FIGS. 4 and 5, I have illustrated two embodiments of trap means, the embodiment of FIG. 5 having the additional advantage of lightness in weight especially of the transporter.

The parts in FIG. 4 and 5 have the same numbers as the corresponding parts in FIG. 3.

Referring to FIG. 4 and 6, the circular grooves 56 and 57 are formed between the inlet ports 15 and 16, between the outlet ports 24 and 25 and between the working surfaces in the areas indicated at 52–55. The grooves are provided with small drain and air vent bores (not shown) which extend to the outside of the housing. It will be seen that the grooves form resin and hardener isolators. Similar out side grooves 58 and 59 may be provided.

Referring to FIG. 5, the manifold plate 10 has circular cutout sections 60, 61 and 62. The sections are provided with air vent/drain bores (not shown) extending to the housing exterior. The circular cut out 61 is disposed in the same relative position as the grooves 56 and 57 and performs the same isolating function. The transporter 11 has circular cut-out sections 63, 64 and 65 which lighten the weight of the transporter.

The transporter 11 is adapted to be rotated as noted following. The rotary air cylinder device 12 is secured to the housing and has an output shaft 66 extending thru the manifold 10 and into the transporter 11 where it is drivingly connected by the hey 67.

A bolt-Bellville washer 68 holds the transporter 11 down against the manifold 10 and effects the desired engagement of the surfaces 13 and 14.

The rotary air cylinder 12 is a conventional fixed cylinder-movable piston device for producing rotary reciprocating motion. The piston is moved back and forth and gearing causes rotation of the shaft 66. The piston is not shown in FIG. 3 but it is indicated at 12a in the diagramatic view of unit 12 in FIG. 7.

Before proceeding, attention is directed back to the discharge condition. During discharge of the cavities 32 and 33, the cavities 42 and 43 being in registry with the ports 15 and 16 are charged or filled. After the charge and discharge operation, the transporter is then moved clockwise. The empty cavities 32 and 33 move toward the charge position and the filled cavities 42 and 43 move along the areas encompassed by lines 54 and 55 to the discharge position. It will be appreciated that the sealing effect along the areas between 54 and 55 is the same as that described for the areas between lines 52 and 53.

As soon as the cavities 32 and 33 begin to register with inlets 15 and 16 the resin and hardener start to enter the respective cavities and push the pistons upwardly until the abutments 40 and 41 are engaged. In the meantime the cavities 42 and 43 are being discharged. The transporter is then moved counter clockwise and the above cycle repeated.

It will be appreciated that the transporter has charge and discharge positions or conditions as respects the cavities 32/33 and 42/43. Thus in FIG. 3, the transporter is in the charge position with reference to cavities 32/33 and in the discharge position with reference to cavities 42/43. When the transporter is moved 180°, it is in the charge position with reference to cavities 42/43 and the discharge position with reference to the cavities 32/33.

The air and electrical control systems will next be described. The description of these systems will be undertaken from the starting point of the cavities 32 and 33 being filled and the cavities 42 and 43 about to be discharged. First, various of the components in the systems will be described.

The pressure for the resin and hardener is developed by air as noted in FIG. 7, where it will be seen that an air supply (not shown) is connected via a filter-regulator 70 to the resin supply 1 and hardener supply 2. The foregoing is an conventional means for supplying pressure. The filter-regulator-lubricator 71 supplies the air control circuit 72 which functions as will be presently described.

Figure 8:
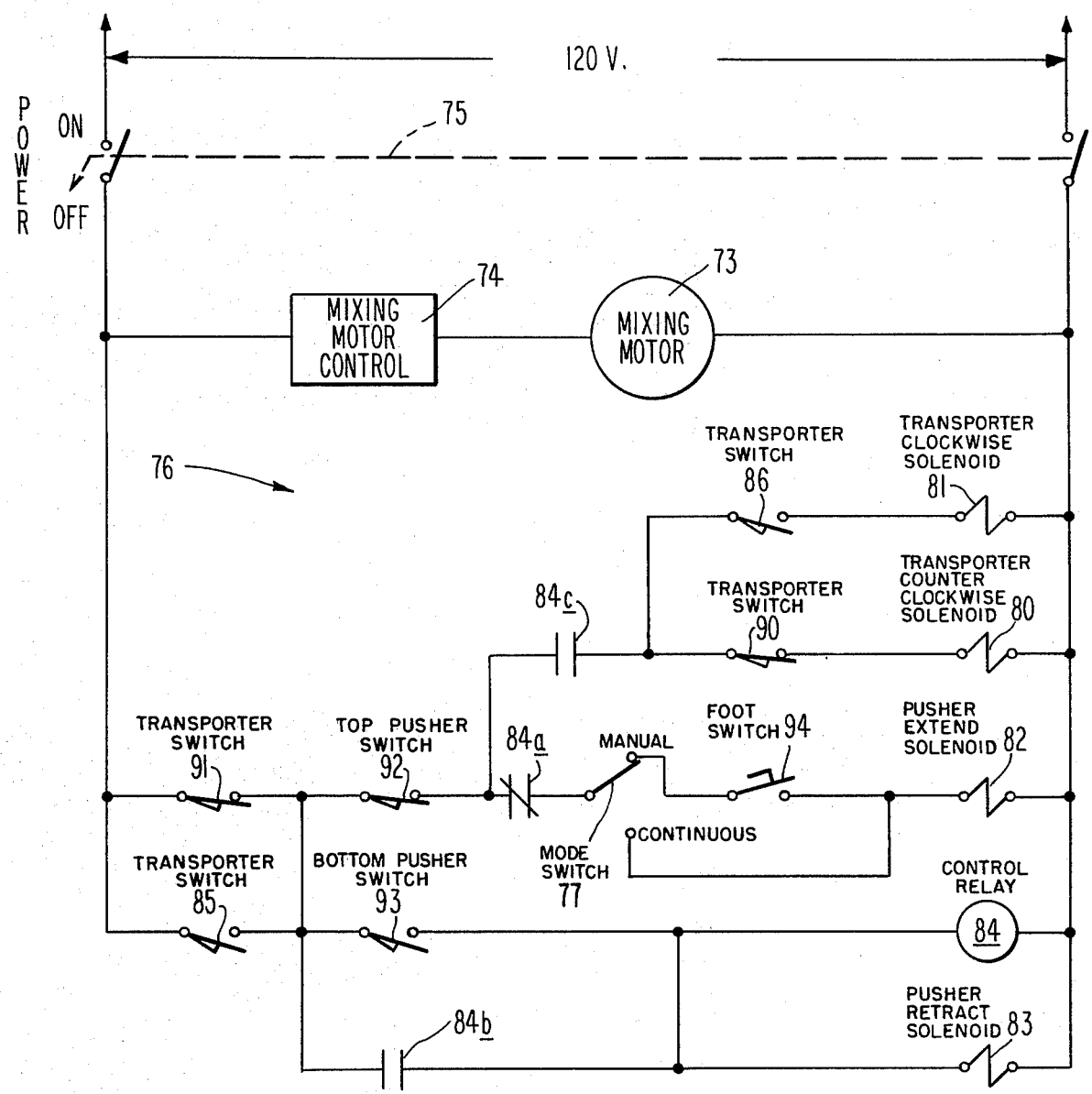
FIG. 8 is a schematic view of an electrical control system for the apparatus.

In FIG. 8, a 120 volt, 60 cycle power supply (not shown) is connected to the mixing motor 73 and its control 74 by the main switch 75. The electrical control circuit 76 is also supplied with power when the switch 75 is closed and functions as will presently be described.

With respect to the mixing motor 73 and its control 74 it is pointed out that these are conventional items. The control 74 provides for turning motor 73 on and off and for the same to operate continuously or intermittently.

Assume that air is being supplied to the resin and hardener sources 3 and 4 and to the air control circuit and the power is supplied to the mixing motor 73 and to control circuit 76. Also, assume that the mode switch 77 (FIG. 8) is in the manual position.

From an inspection of FIG. 8, it will be evident from the condition of the various switches that the transporter solenoids 80 and 81 and the pusher solenoid 82 and 83 along with the control relay 84 are all de-energized. The switch contacts 84a, 84b and 84c of the control relay 84 have assumed the conditions noted.

Note with references to FIG. 3 that the transporter air unit 12 has a pair of switches 85/86 on the right side and a pair of switches 90/91 on the left side. The pusher air unit has a top switch 92 and a bottom switch 93. The switches 85/86, 90/91 and 92/93 are also indicated in FIG. 7.

The switches 85, 86 90, 91, 92 and 93 are the conventional magnetic-reed type there being a reed contact on the air cylinder and a magnet on the moving piston which closes the reed contact when in close proximity and opens the reed contact when it moves away.

Thus with reference to FIGS. 3 and 7, when the transporter piston 12a has moved to the left the switches 85 and 86 are open and the switches 90 and 91 closed. When the pistons 12a moves to the right switches 85 and 86 close and switches 90 and 91, open. Back and forth motion repeats the cycle.

Further with reference to FIG. 7, the pusher air unit piston 51a is in the up position the top switch 92 is closed and the bottom switch 93 is open and when the piston 51a moves down the top switch 92 opens and the bottom switch 93 closes.

Also in FIG. 7, the pusher valve 95 has spools and 95a and 95b respectively under control of the pusher solenoids 82 and 83. The spools are adapted to be placed in registry with the connected lines by the solenoids. The transporter valve 96 has spools 96a and 96b controlled by solenoids 80 and 81 which function to bring the spools in registry with connected lines.

As will be noted in FIG. 7 the valve 95 has moved the pusher piston 51a up so that the pusher 50 is in the retracted position and the valve 96 has moved the transporter piston 12a to the left so that the transporter has placed the cavities 32 and 33 in the charge position and the cavities 42 and 43 in the discharge position (as in FIG. 3).

The speed at which the pusher 50 is moved both to the extended and retracted position is determined by the conventional air control units 100 and 101. Similarly, the rate at which the transporter moves in the clockwise and counter clockwise directions is determined by similar air control units 102 and 103.

To initiate the operation; i.e. to cause the mixer to discharge a shot of mix, the operator momentarily depresses foot switch 94. This causes the pusher to move down to the extended position (to discharge cavities 42 and 43) and then move to the retracted position so that the transporter can be rotated to bring the cavities 32 and 33 into position for discharge and the cavities 42 and 43 into position for charge. The manner in which the foregoing is accomplished is treated following.

When the foot switch 94 is closed, the solenoid 82 is energized. The spool 95a moves into registry position and the spool 95b moves out. Air is supplied to move the piston 51a down. The top pusher switch 92 opens to de-energize the solenoid 82. This does not affect the spool 95a since it is already in position. It does insure that the transporter cannot function until the pusher is in the retracted position.

When the pusher has moved to the extended position the bottom switch 93 is closed the resin and hardener in cavities 42 and 43 has been discharged and the mixer has provided a shot of mix.

The closure of switch 93 energizes control relay 84. The relay contacts 84a open and the relay contacts 84b and 84c close. The relay is held up thru contact 84b. The closure of switch 93 also energizes pusher retract solenoid 83. This causes the spool 95a to move out of registry and the spool 95b to move into registry (as in FIG. 7). This causes the pusher piston 51a to move up. The bottom pusher switch 93 opens and the top pusher switch 92 closes.

With the closure of top pusher switch 92, the transporter counter clockwise solenoid 80 is energized. This causes the spool 96a to move into registry and spool 96b out of the registry. Air is supplied to unit 12 so that the piston 12a moves to the right. The switches 90 and 91 open.

The opening of transporter switch 90 de-energizes the solenoid 80 but this has no affect on the spool 96a since it is already in position. The opening of switch 91 insures that the transporter solenoid 81 cannot operate until later.

The opening of switch 91 also insures that pusher extend solenoid 82 cannot be energized while the transporter is rotating counter clockwise and conversly opening of switch 85 prevents energizing of solenoid 82 while the transporter is rotating clockwise.

When the transporter has completed counter clockwise move, the transporter switches 85 and 86 close. The cavities 42 and 43 charge. The cavities 32 and 33 are ready to be discharged.

The opening of the switch 91 de-energizes the control relay 84. The contacts 84a close and the contacts 84b and 84c open, Thus, with transporter switch 85 closed and top pusher switch 92 closed, the foot switch 94 can be actuated. The apparatus functions as above described; i.e. to cause the cavities 32 and 33 to discharge and the mixer 6 to eject a spot of mix etc.

It is preferable that the motor 73 driving the mixer be operated only when required so as to avoid heat generation which might have an undesired effect on the mix such as speeding up the hardening time. Thus, in the line from valve 95 which supplies air to unit 51 to move the pusher 50 down I have included a pressure sensitive sensor 104. When the pressure in the line and in the unit 51 rises, the sensor 104 is actuated to signal the mixer motor to commence operation. When the pressure is reduced; i.e. when the pusher 50 starts to retract, the sensor signals the mixer motor to stop.

Before closing I want to comment on two of the principal features of the invention; i.e. ratio consistency and speed.

It will be noted that during charge of the cavities, the ingredients are pushed up into the cavities. This is done by air pressure. Thus, there is a large positive forward thrust on a mass of material which causes the same to move rapidly only in the direction it can go, i.e. up into the cavities. Therefore, irrespective of viscosity the cavities are completely filled with the same amount at each charge. The ingredients are discharged from the cavities by a mechanical pushing force. This results in all material being fully and rapidly discharged.

Finally, it will be apparent that simultaneous charge and discharge speeds up the operation.

What is claimed is:

1. In apparatus for delivering accurate amounts of a mixture of at least two liquid ingredients, including ingredient supply means and mixer means to receive, mix and deliver said mixture, measuring means to be disposed between said supply and mixer means to determine the quantity of each ingredient to be delivered to the mixer means, the measuring means comprising:
   a hollow housing;
   a plurality of pairs of ports in said housing, each pair comprising an inlet port and an outlet port and each port having a mouth;
   working surface means extending around and between the inlet port and outlet port of each said pair, the mouth of each port being open to the working surface means;
   transporter means movably mounted in said housing for movement as between a charge position and a discharge position;
   a plurality of cavities formed in said transporter means, each cavity having a mouth;
   means to move said transporter means as between said positions;
   working surface means on said transporter means, the mouth of each cavity being open to last said working surface means;
   the first said working surface means and last said working surface means being in engagement when the transporter means is in said charge and discharge positions and as it moves between the same;
   said cavities respectively being in registry with said inlet ports when said transporter means is in the charge position and being respectively in registry with said outlet ports when the transporter means is in the discharge position and said inlet ports and said cavities being closed off respectively by the engagement of said working surface means when the transporter means moves as between said charge and discharge positions;
   inlet passage means in said housing respectively independently connecting each inlet port to the exterior of said housing for respectively independently delivering ingredients from the exterior of the housing to the inlet ports and thence into the respective cavities;
   outlet passage means in said housing respectively independently connecting each outlet port to the exterior of said housing for respectively independently delivering ingredients from cavities to the exterior of the housing; and
   control means operative when the transporter means is in the charge position to control the amount of ingredient material to be received by a cavity and operative when the transporter means is in the discharge position to cause ingredient material in each cavity to flow out of the cavity and into said outlet passage means.

2. The measuring means of claim 1 further including trap means formed in said housing.

3. The measuring means of claim 1 wherein said control means includes, for each cavity;
   piston means mounted for receiprocating motion therein as between a charge position and discharge position, in the charge position the piston being spaced inwardly from the mouth of the cavity whereby ingredient material can enter the cavity and in the discharge position the piston being adjacent the mouth of the cavity and the piston means in moving from the charge position to the discharge position pushing ingredient material out of the cavity; and
   abutment means to be engaged by the piston means to determine said charge and discharge positions;

4. The measuring means of claim 3 wherein the point of engagement between the abutment means and the piston means to determine said charge position can be adjusted to increase or decrease the amount of ingredient material entering the cavity.

5. The measuring means of claim 4 wherein said control means includes mechanism for moving each piston from charge to discharge position comprising pusher means mounted on said housing for motion between a retracted position and an extended position, in the retracted position the pusher being spaced from said piston means and when moved from the retracted position to the extended position engaging each piston in its charge position and moving the same to its discharge position and means for moving said pusher means.

* * * * *